United States Patent [19]

Iwasaki et al.

[11] Patent Number: 4,939,415

[45] Date of Patent: Jul. 3, 1990

[54] DEFLECTION YOKE

[75] Inventors: Katsuyo Iwasaki, Nishinomiya; Shigeya Ashizaki, Takatsuki; Osamu Konosu, Nagaokakyo, all of Japan

[73] Assignee: Matsushita Electronics Corporation, Kadoma, Japan

[21] Appl. No.: 291,644

[22] Filed: Dec. 29, 1988

[30] Foreign Application Priority Data

Dec. 29, 1987 [JP] Japan ................................ 62-334566

[51] Int. Cl.[5] ...................... H01J 29/70; H04N 5/645; H01F 3/12

[52] U.S. Cl. .................................... 313/440; 358/248; 335/211

[58] Field of Search ................ 313/440; 358/248, 249; 335/211

[56] References Cited

U.S. PATENT DOCUMENTS 4,746,837 5/1988 Vink ................................ 313/440 X

FOREIGN PATENT DOCUMENTS 59-16250 1/1984 Japan .
59-161259 10/1984 Japan .
62-55851 3/1987 Japan .

*Primary Examiner*—Sandra L. O'Shea
*Attorney, Agent, or Firm*—Cushman, Darby & Cushman

[57] ABSTRACT

A deflection yoke to be used in a color CRT apparatus having an aspherical face panel (30) has a pair of magnetic members (6,7) disposed on an outer surface of a larger diameter part of a cone shaped coil holding frame (11) in symmetry with respect to a vertical plan including center axis of the coil holding frame (11). Each of magnetic member (6,7) has upper and lower magnetic parts (*6b,6c*) for distorting vertical deflection magnetic field from barrel shape to pincushion shape, and the upper or lower magnetic parts (*6b*, or *6c*) has protruded magnetic parts (*6d* or *6e*), respectively protruded from the upper or lower magnetic parts (*6b* or *6c*) towards screen part of the color CRT apparatus, for partially correction of pincushion distortion of raster at peripheral part of screen.

14 Claims, 4 Drawing Sheets

DEFLECTION YOKE

BACKGROUND OF THE INVENTION

1. Field of the Invention

The present invention relates to a deflection yoke for CRT apparatus, and especially relates to an improved deflection yoke to be used in an in-line type color CRT apparatus having an aspherical face panel.

2. Description of the Prior Art

Generally, a deflection yoke to be used in a color CRT apparatus having an in-line type electron gun is constituted to generate a vertical deflection magnetic field distorted in a barrel shape, and a horizontal deflection magnetic field distorted in a pincushion shape. Thereby, a self-convergence effect can be obtained in the color CRT apparatus.

Furthermore, the vertical deflection magnetic field can be partially distorted to be in a pincushion shape in a part near the phosphor screen formed on the back surface of the face panel of the CRT apparatus. Thereby a distortion of right and left raster can be corrected without losing the self-convergence effect, while the whole distribution of the vertical deflection magnetic field can be in a barrel shape.

In a conventional deflection yoke, for example, shown in Published Unexamined Japanese Patent Application Sho 59-16250. Published Unexamined Japanese Utility Model Application Sho 59-161259 or Published Unexamined Japanese Patent Application Sho 62-55851, a pair of magnetic pieces for generating a pincushion shaped magnetic field are provided on an inner surface of a vertical deflection coil near the phosphor screen. Upper and lower parts of the magnetic pieces protrude toward the outside of the coil. Such a conventional deflection magnetic yoke is known in the art, and therefore its details are not shown in the drawings.

When such a conventional deflection yoke is used in a color CRT apparatus having a spherical face panel, pincushion distortion of the raster in vertical and horizontal directions on the phosphor screen can be corrected without losing the self-convergence effect.

However, in recent years the spherical face panel of the color CRT has become progressively flatter. Therefore, the pincushion distortion of the raster becomes more apparent; even though the above-mentioned conventional technology to prevent the distortion of right and left raster is used.

FIG. 2 shows an example of the pincushion distortion of the raster appearing in the color CRT apparatus having the flattened aspherical face panel where the above-mentioned conventional deflection yoke is used. The spherical face panel has a radius of curvature at a peripheral part larger than that at a center part. When the pincushion distortion of the raster at the peripheral part is extremely larger than that at center part as shown in FIG. 2, the correction of the distortion becomes very difficult.

SUMMARY OF THE INVENTION

An object of the present invention is to provide an improved deflection yoke to be used in a color CRT apparatus having an spherical face panel, in order to correct distortion of raster especially at a peripheral part, thereby reducing total pincushion distortion of the raster on the whole screen.

A deflection yoke for CRT apparatus in accordance with the present invention comprises:

a horizontal deflection coil for generating a horizontal deflection magnetic field distorted in pin-cushion shape, a vertical deflection coil for generating a vertical deflection magnetic field distorted in barrel shape, a frame for holding said horizontal deflection coil and said vertical deflection coil and having a cone part adapted to conform to a neck portion of a CRT, a flange part formed on a larger diameter end part of said cone part, and a pair of magnetic members provided symmetrically with respect to a vertical plane including a center axis of said frame, said magnetic members each respectively having a first magnetic part disposed on the outer surface and on a larger diameter end part of said cone part adjacent to said flange, and an upper second magnetic part and lower second magnetic part extended radially from said center axis and substantially perpendicular to said first magnetic part and disposed along a backside surface of said flange, and an upper and lower third magnetic part substantially perpendicular to said upper and lower second magnetic parts and respectively protruding therefrom toward a screen part of a CRT.

By selecting the shape, size and position of the third magnetic parts of the magnetic members properly, the distortion of the raster at a peripheral part can be selectively and partially corrected, and thereby the pincushion distortion of the raster at a center part and a peripheral part of the screen of the CRT apparatus can be evenly corrected.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

A preferred embodiment of a deflection yoke in accordance with the present invention is described referring to FIG. 1, FIG. 3, FIG. 4, FIG. 5(A), FIG. 5(B) and FIG. 6.

Figure 1:
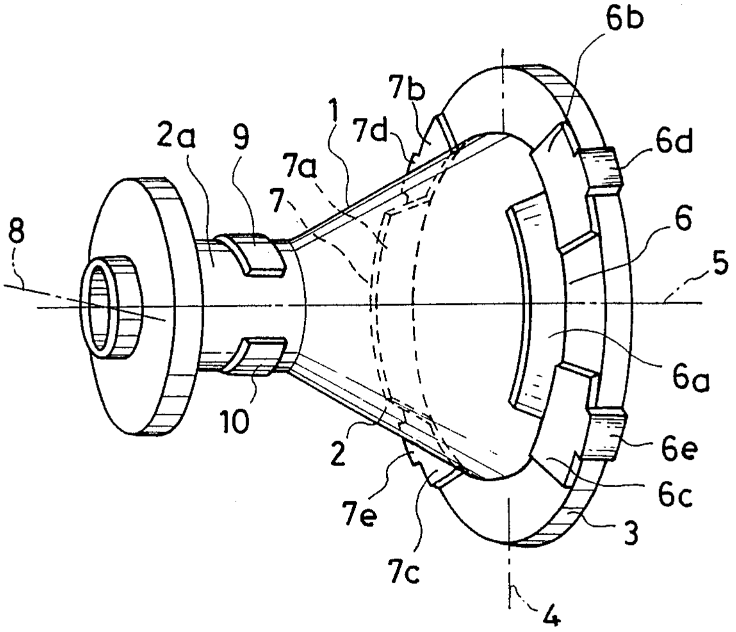
FIG. 1 is a perspective view showing a preferred embodiment of a frame with magnetic members of a deflection yoke in accordance with the present invention wherein deflection coils are not mounted yet.
Figure 2:
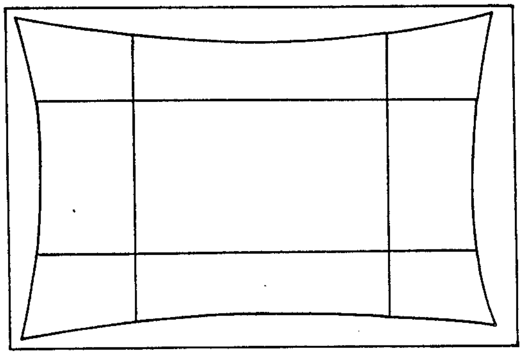
FIG.2 (Prior Art)
FIG. 2 is a drawing schematically showing pin-cushion distortion of raster when conventional deflection yoke is used in a color CRT apparatus having an aspherical face panel.

As shown in FIG. 1, a coil holding frame 1 made of resin has a cone part 2 and a flange part 3 which extends from a larger diameter part of the cone part 2. First and second magnetic members 6 and 7 are disposed on outer surface of the coil holding frame 1 so as to be symmetrical with respect to a vertical plane including a vertical axis 4 and a center axis 5 of the coil holding frame 1.

Figure 3:
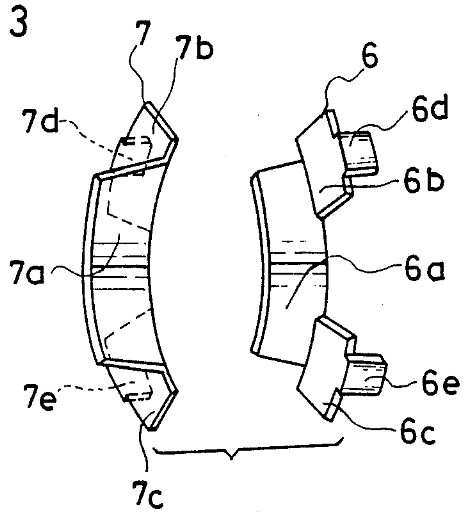
FIG. 3 is a perspective view showing a preferred embodiment of a pair of (first and second) magnetic members of the deflection yoke in accordance with the present invention.

The first and second magnetic members 6 and 7, shown in FIGS. 1 and 3, have first magnetic part 6*a* and 7*a*, respectively, disposed on the outer surface of the cone part 2 adjacent to flange 3 where the diameter of cone part 2 is largest. Upper and lower second magnetic parts 6*b* and 6*c* extend from the first magnetic part 6*a* substantially perpendicular thereto. Similarly, upper and lower second magnetic parts 7*b* and 7*c* extend from the first magnetic part 7*a* and substantially perpendicular thereto. The second magnetic parts 6*b* and 6*c* are disposed only on the circular rear surface of the flange part 3 of the coil holding frame 1. Each second magnetic part 6*a*, 6*b*, 7*a* and 7*b* has third magnetic parts 6*d*, 6*e*, 7*d* and 7*e*, respectively, protruding from outer ends of the second magnetic parts 6*b* and 6*c* toward the front surface of the flange part 3 and face panel of the color CRT apparatus. The a first magnetic member 6 is made by integration or magnetic conductive combination of the first, second and third magnetic parts 6*a*, 6*b*, 6*c* and 6*e* in one piece. The upper and lower second magnetic parts 6*b* and 6*c* are disposed in symmetry with each other and with respect to a horizontal plane including a horizontal axis 8 and the center axis 5 of the cone part 2 of the coil holding frame 1. The third magnetic parts 6*d* and 6*e* also are disposed in symmetry with each other and with respect to the horizontal plane.

Figure 4:
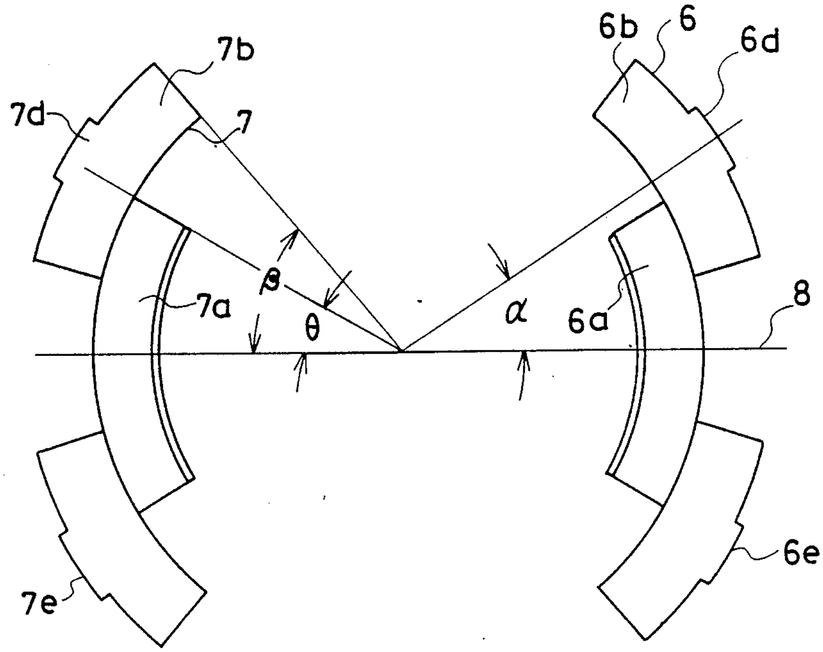
FIG. 4 is a plan view showing the magnetic members shown in FIG. 3.

FIG. 4 is a plan view showing the magnetic members 6 and 7. An angle $\theta$ between the horizontal axis 8 and the upper end of the first magnetic parts 8*a* or 7*a* of the first and second magnetic members 6 and 7 and an angle $\beta$ between the horizontal axis 8 and the upper end of the second magnetic parts 6*b* or 7*b* are determined by the degree of correction necessary for the pincushion distortion of the raster at upper and lower parts of the screen. As shown in FIG. 4, the former angle is generally selected in a range from 30° to 70° and the latter is selected in a range from 30° to 80°.

An angle $\alpha$ between the horizontal axis 8 and a center line of the third magnetic part 6*d* or 7*d* is also determined on the basis of the degree of correction necessary for the pincushion distortion of the raster at a peripheral part of the screen. The angle $\alpha$ is properly to be selected above 30° and below 80°. Heights of the third magnetic parts 6*d*, 6*e*, 7*d* and 7*e* in a direction parallel to the center axis 5 of the coil holding frame 1 are designed also on the basis of the degree of correction necessary for the pincushion distortion of the raster at peripheral part of the screen. The height of the third magnetic parts 6*d*, 6*e*, 7*d* and 7*e*, however, are not to surpass the thickness of the peripherary of the flange part 3 of the coil holding frame 1, and is at most the same as the thickness thereof when the height is at a maximum.

On the other hand, as shown in FIG. 1, the third and fourth magnetic members 9 and 10 are provided on an outer surface of a cylindrical part 2*a* extended from a small diameter part of the cone part 2 which is in a part near to an electron gun. The third and fourth magnetic members 9 and 10 are disposed symmetrically with other and with respect to the center axis 5. Such third and fourth magnetic members 9 and 10 intensify the barrel distortion of the vertical deflection magnetic field in a part near the electron gun.

Figure 5A:
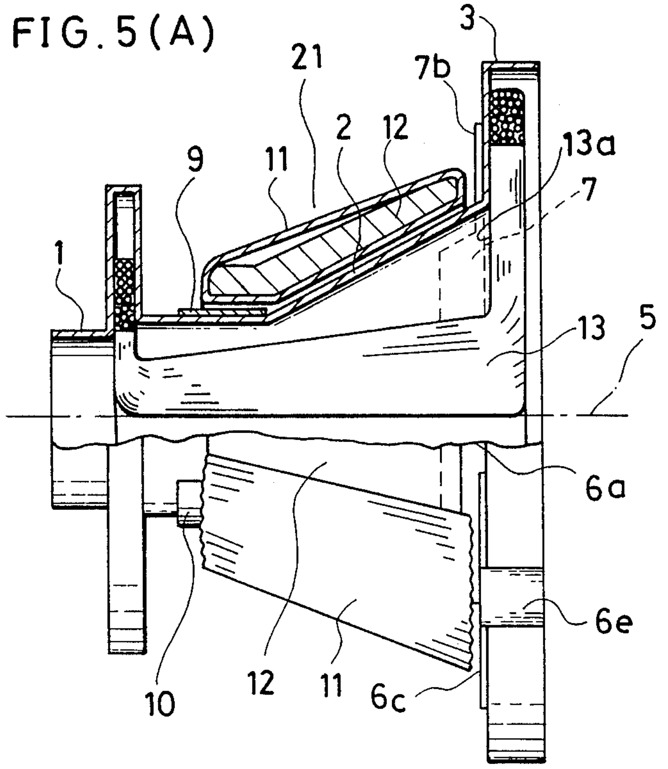
FIG. 5(A) is a partially sectioned side view showing the deflection yoke in accordance with the present invention.

A deflection yoke shown in FIG. 5(A) is assembled by connecting a toroidal type vertical deflection coil 11 for generating a vertically deflected magnetic field distorted in a barrel shape, plus a ferrite core 12 and a saddle type horizontal deflection coil 13 for generating a horizontally deflected magnetic field distorted in a pincushion shape on the above-mentioned coil holding frame 1. The first magnetic parts 6*a* and 7*a* of the first and second magnetic members 6 and 7 are respectively positioned inside of the vertical deflection coil 11. And the second magnetic parts 6*b*, 6*c*, 7*b* and 7*c* are respectively positioned on a plane substantially vertical to the center axis 5, and face outer end 13*a* of the vertical deflection coil 11 at the part near to the screen of the CRT apparatus.

The third and fourth magnetic members 9 and 10 are partially positioned inside the vertical deflection coil 11 and the rest part thereof are exposed outside of the vertical deflection coil 11.

Figure 5B:
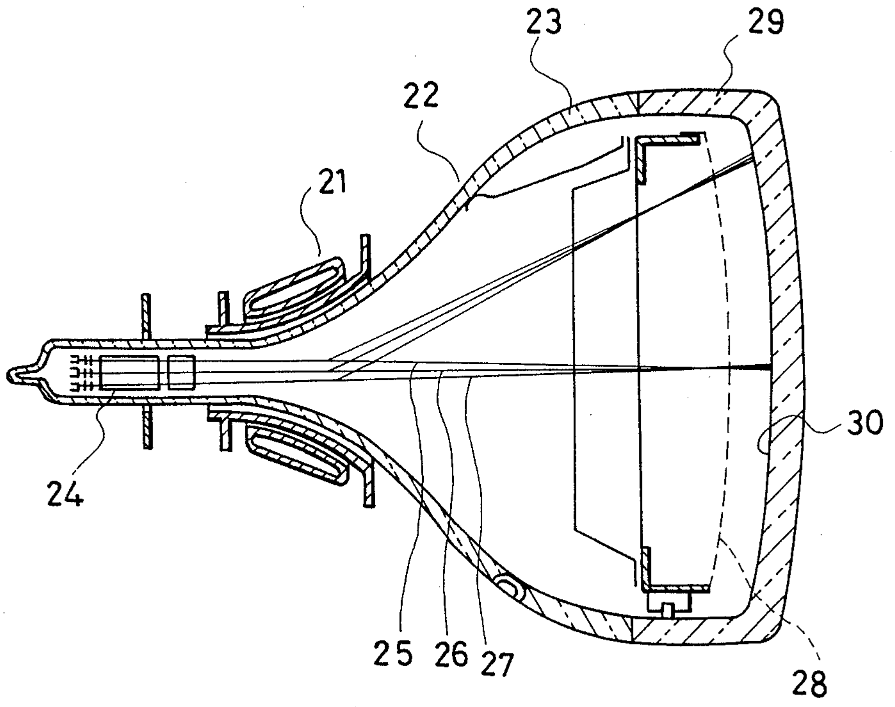
FIG. 5(B) is a cross-sectional plan view showing a color CRT apparatus using the deflection yoke in accordance with the present invention.
Figure 6:
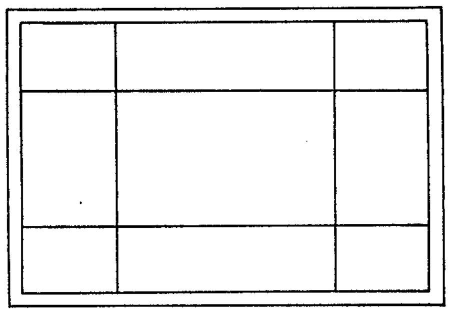
FIG. 6 is a drawing showing raster on a screen of a color CRT apparatus having an aspherical face panel when the deflection yoke in accordance with the present invention is used thereto.

FIG. 5(B) is a cross-sectional plan view showing a color CRT apparatus having an aspherical face panel using the above-mentioned deflection yoke. As shown in FIG. 5(B), the deflection yoke 21 is disposed on a funnel part 23 of the color cathode ray tube 22. Three electron beams 25, 26 and 27 modulated by image signals and emitted from an electron gun 24 are horizontally and vertically deflected by the deflection yoke 21. The electron beams 25, 26 and 27 pass through slots or apertures of a shadow mask 28 and impinge on dots or stripes of red, green and blue colored phosphors of a phosphor screen 30 formed on inner surface of the aspherical face panel 29. Thereby, an image is formed on the screen 30 of the face panel 29.

In the above-mentioned deflection yoke, the vertically deflected magnetic field generated by the vertical deflection coil 11 acts on the first and second magnetic members 6 and 7 at the part near the screen of the CRT apparatus. Thereby, the first and second magnetic parts 6*a*, 6*b*, 6*c*, 7*a*, 4*b* and 7*c*, which are disposed at corners of a rectangle, generate a correction magnetic field desirably distorted in pincushion shape. The third magnetic parts 6*d*, 6*c*, 7*d* and 7*e*, which protrude towards the screen from outer peripheral of the flange part 3, partially correct the pincushion distortion of the raster at a peripheral part of the screen.

As a result, the pincushion distortion of the raster, which appears at the periphery of the aspherical face panel of the color CRT apparatus when the conventional deflection yoke is used, can be corrected in the color CRT apparatus using the deflection yoke in accordance with the present invention. Furthermore, the pincushion distortion at the center part and the periphery of the screen can be evenly corrected. Therefore, an ideal raster shown in FIG. 6 can be obtained.

Although the invention has been described in its preferred form with a certain degree of particularity, it is understood that the present disclosure of the preferred form has been changed in the details of construction and other combinations and arrangements of parts may be resorted to without departing from the spirit and the scope of the invention as hereinafter claimed.

What is claimed is:

1. A deflection yoke for a CRT having a neck portion and a screen portion, comprising:

a horizontal deflection coil for generating a horizontal deflection magnetic field distorted in pin-cushion shape;

a vertical deflection coil for generating a vertical deflection magnetic field distorted in barrel shape;

a frame for holding said horizontal deflection coil and said vertical deflection coil and having a cone part adapted to conform to a neck portion of a CRT, and a flange part formed on a larger diameter end part of said cone part; and a pair of magnetic members provided symmetrically with respect to a vertical plane including a center axis of said frame, said magnetic members each respectively having a first magnetic part disposed on the outer surface and on a larger diameter end part of said cone part adjacent to said flange, and an upper second magnetic part and lower second magnetic part extended radially from said center axis and substantially perpendicular to said first magnetic part and disposed along a backside surface of said flange, and an upper and lower third magnetic part substantially perpendicular to said upper and lower second magnetic parts and respectively protruding therefrom toward a screen part of a CRT.

2. A deflection yoke in accordance with claim 1, wherein the widths of said third magnetic parts are narrower than the widths of said second magnetic parts.

3. A deflection yoke in accordance with claim 1, wherein the heights of said third magnetic parts in a direction parallel to said center axis of said frame are substantially the same or less than the thickness of the outer periphery of said flange part of said frame.

4. A deflection yoke in accordance with claim 1, wherein angles between a horizontal axis of said frame and upper and lower ends of said first magnetic parts of said pair of magnetic members are in a range from 30° to 70°.

5. A deflection yoke in accordance with claim 1, wherein angles between a horizontal axis of said frame and center of said second magnetic parts of said pair of magnetic members are in a range from 30° to 80°.

6. A deflection yoke in accordance with claim 1, wherein angles between a horizontal axis of said frame and center of said third magnetic parts of said pair of magnetic members are in a range from 30° to 80°. flange, and an upper and lower third magnetic part perpendicular to said upper and lower second magnetic parts and respectively protruding therefrom toward the face panel.

7. A deflection yoke in accordance with claim 1, wherein said flange part has a front and rear surface, the front surface being closer to the screen part of the CRT than the rear surface, and said upper and lower third magnetic parts protrude toward the front surface of the flange.

8. A color CRT apparatus comprising:

(a) a funnel part;

(b) a spherical face panel having phosphor screen formed on inner surface thereof;

(c) a deflection yoke disposed on said funnel part, said deflection yoke comprising:

a horizontal deflection coil for generating horizontal deflection magnetic field distorted in pin-cushion shape;

a vertical deflection coil for generating vertical deflection magnetic field distorted in barrel shape;

a frame for holding said horizontal deflection coil and said vertical deflection coil and having a cone part adapted to conform to the funnel part, and a flange part formed on a larger diameter end part of said cone part; and a pair of magnetic members provided symmetrically with respect to a vertical plane including a center axis of said frame, said magnetic members respectively having first magnetic parts disposed on the outer surface of said cone part adjacent to said flange, and upper second magnetic parts and lower second magnetic parts extended radially from said center axis and substantially perpendicular to said first magnetic part and disposed along surface of said 9. A color CRT apparatus in accordance with claim 8, wherein said flange part has a front and rear surface, the front surface being closer to the face panel of the CRT than the rear surface, and said upper and lower third magnetic parts protrude toward the front surface of the flange.

10. A color CRT apparatus in accordance with claim 8, wherein the widths of said third magnetic parts are narrower than the widths of said second magnetic parts.

11. A color CRT apparatus in accordance with claim 8, wherein the heights of said third magnetic parts in a direction parallel to said center axis of said frame are substantially the same or less than the thickness of the outer periphery of said flange part of said frame.

12. A color CRT apparatus in accordance with claim 8, wherein angles between a horizontal axis of said frame and upper and lower ends of said first magnetic parts of said pair of magnetic members are in a range from 30° to 70°.

13. A color CRT apparatus in accordance with claim 8, wherein angles between a horizontal axis of said frame and center of said second magnetic parts of said pair of magnetic members are in a range from 30° to 80°.

14. A color CRT apparatus in accordance with claim 8, wherein angles between a horizontal axis of said frame and center of said third magnetic parts of said pair of magnetic members are in a range from 30° to 80°.

* * * * *